United States Patent [19]
Morden

[11] 3,911,802
[45] Oct. 14, 1975

[54] CLOSURE ASSEMBLY AND ACTUATOR
[75] Inventor: Russell L. Morden, Lansing, Mich.
[73] Assignee: General Motors Corporation, Detroit, Mich.
[22] Filed: June 12, 1974
[21] Appl. No.: 478,598

[52] U.S. Cl. ......... 98/2.14; 296/137 H; 296/137 G; 49/325
[51] Int. Cl.² ...................... B60H 1/26; E05F 11/00
[58] Field of Search ............. 98/2.14, 2.15; 49/324, 49/325; 296/137 B, 137 C, 137 D, 137 G, 137 H

[56] References Cited
UNITED STATES PATENTS

| | | | |
|---|---|---|---|
| 2,140,842 | 12/1938 | Madsen | 49/325 |
| 2,355,932 | 8/1944 | Walton | 49/325 |
| 2,599,760 | 6/1952 | Hanson | 49/325 |
| 2,832,590 | 4/1958 | Youngberg | 49/325 |
| 2,985,483 | 5/1961 | Bishop et al. | 296/137 G |
| 3,683,993 | 8/1972 | Perks | 296/137 H |
| 3,788,160 | 1/1974 | Sielk | 296/137 G |
| 3,806,186 | 4/1974 | Mauron | 296/137 H |

Primary Examiner—John J. Camby
Assistant Examiner—Henry C. Yuen
Attorney, Agent, or Firm—Donald F. Scherer

[57] ABSTRACT

A closure assembly having an actuating mechanism in which a rotary input motion is translated to linear output motion for controlling the movement of the closure. The closure is pivotally mounted for opening and closing an aperture in a panel. The actuating mechanism has a drive member, such as a link chain, flexible in one direction and capable of transmitting motion while in compression. The drive member is secured to the closure such that the linear movement of the actuator output results in pivotal opening of the closure.

3 Claims, 10 Drawing Figures

CLOSURE ASSEMBLY AND ACTUATOR

This invention relates generally to closure actuator assemblies and more particularly actuator assemblies for affecting opening movement of pivotally supported closures.

In closed automobile type vehicle bodies it is desirable to provide some means for evacuating or venting the interior of passenger compartment portion while simultaneously admitting fresh air so that a constant air circulation is maintained. One convenient approach to the venting problem embodies a vent aperture in the roof of the body portion adopted to be selectively closed by a closure pivotally supported adjacent one edge of the vent aperture, the closure normally being pivoted adjacent its leading edge so that it presents a shield in the open position to avoid scooping outside air into the body interior. In this type of installation it is necessary to pivot the closure only a small amount to achieve adequate venting. A closure actuator according to this invention is particularly adapted for ventilator installations of the type described, and functions to provide adequate closure movement while maintaining a low profile to maximize useable space within the passenger compartment or body interior.

The primary feature of this invention is that it provides an improved closure actuator assembly particularly for roof ventilator applications in automobile type vehicle bodies. Another feature of this invention is that it provides an improved closure operator assembly which presents a relatively low profile which maximizes useable passenger compartment space when the improved actuator assembly is disposed on the roof of the compartment.

Yet another feature of this assembly resides in the provision of an improved actuator assembly including a drive element attached to the closure and flexible in only one direction and operative for force transmission in compression, a relatively flat housing in the body adjacent the vent aperture for slidably supporting the drive element parallel to the plane of the aperture, and a rotary input drive for expelling the drive element from the housing to open the closure.

A further feature of this invention, in one embodiment, resides in the provision of an improved closure actuator assembly having a rotary input drive including a screw member on the housing and a nut member on the screw member, the nut member being connected to the drive element and the screw member being rotated to effect opening of the closure by a remote power source through a flexible rotary cable.

A still further feature of this invention, in another embodiment, resides in the provision of an improved closure actuator assembly having a rotary input drive including a crank member rotatably supported on the housing and a yoke connected to the drive element and supported on the housing for bodily shiftable movement, the yoke engaging the crank member and being bodily shiftable in response to rotation of the latter.

These and other features of this invention will be readily apparent from the following specification and from the drawings wherein.

Figure 1:
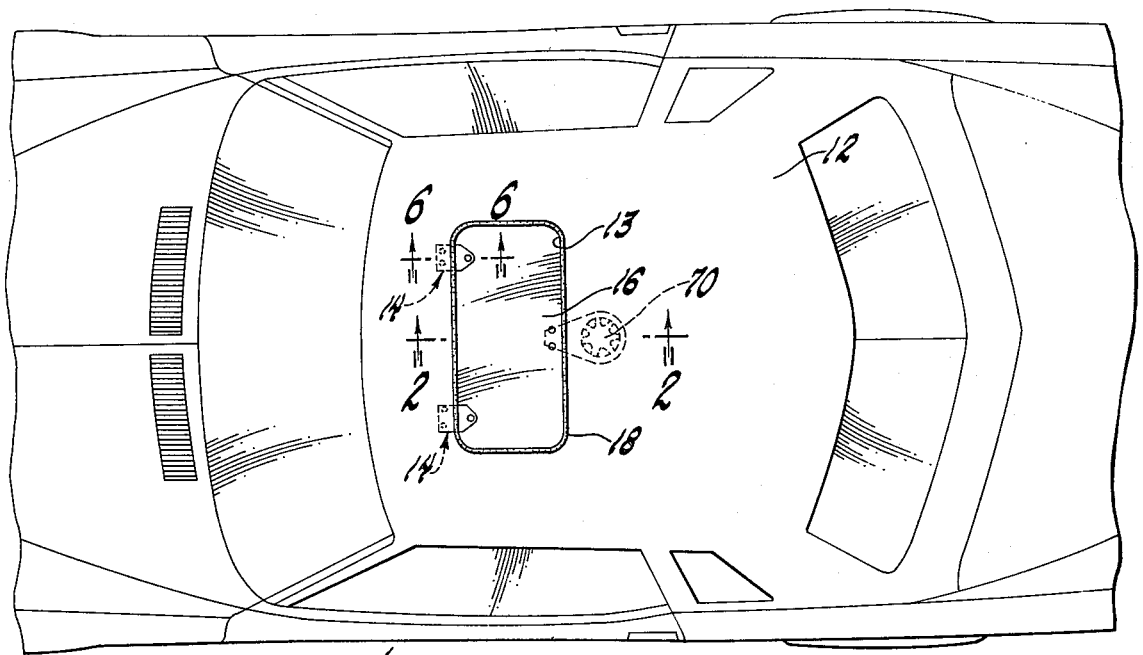
FIG. 1 is a top view of a panel having an aperture and closure.
Figure 2:
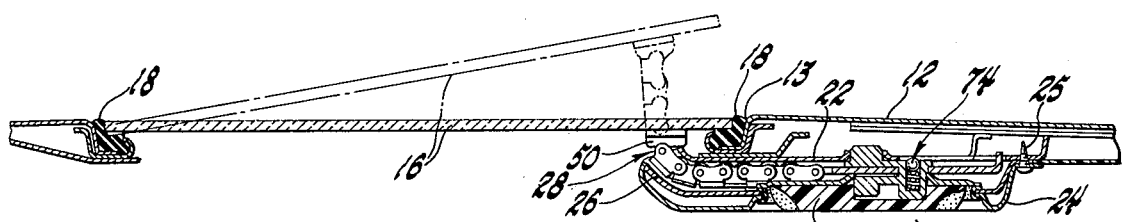
FIG. 2 is a cross-sectional view of one embodiment taken along line 2—2 of FIG. 1.
Figure 3:
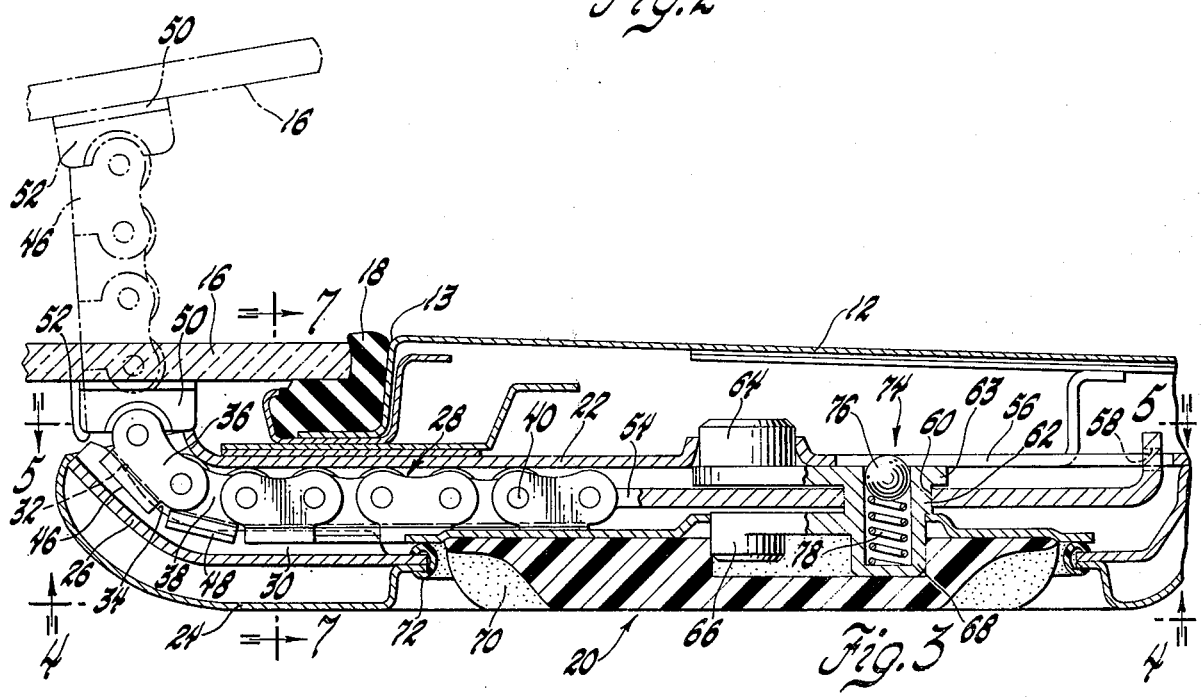
FIG. 3 is an enlarged view of a portion of FIG. 2.

Referring to the drawings wherein like characters represent the same or corresponding parts there is shown in FIG. 1 a passenger vehicle 10 having a roof panel 12 in which is disposed an aperture 13 which is closed by a closure panel 16 pivotally mounted on the roof 12 by a pair of hinges 14. As seen in FIGS. 2 and 3, the closure panel 16 may be moved between the closed position shown in solid lines and an open position shown in phantom lines. When the closure 16 is in a closed position, a seal 18 prevents air and water leakage to and from the passenger compartment. The closure 16 is opened by a closure mechanism generally designated 20.

The closure mechanism 20 includes a bracket 22 and a cover 24 which are secured to the roof panel 12 by threaded fasteners 25. A guide 26 is secured to the cover 24 to control the linear movement of a drive chain 28. The guide 26 has a linear portion 30 substantially parallel to the roof panel 12 and exit portion 32 substantially perpendicular to the roof panel 12 substantially adjacent the edge of aperture 13 and a curved portion 34 joining the portion 30 and 32.

Figure 4:
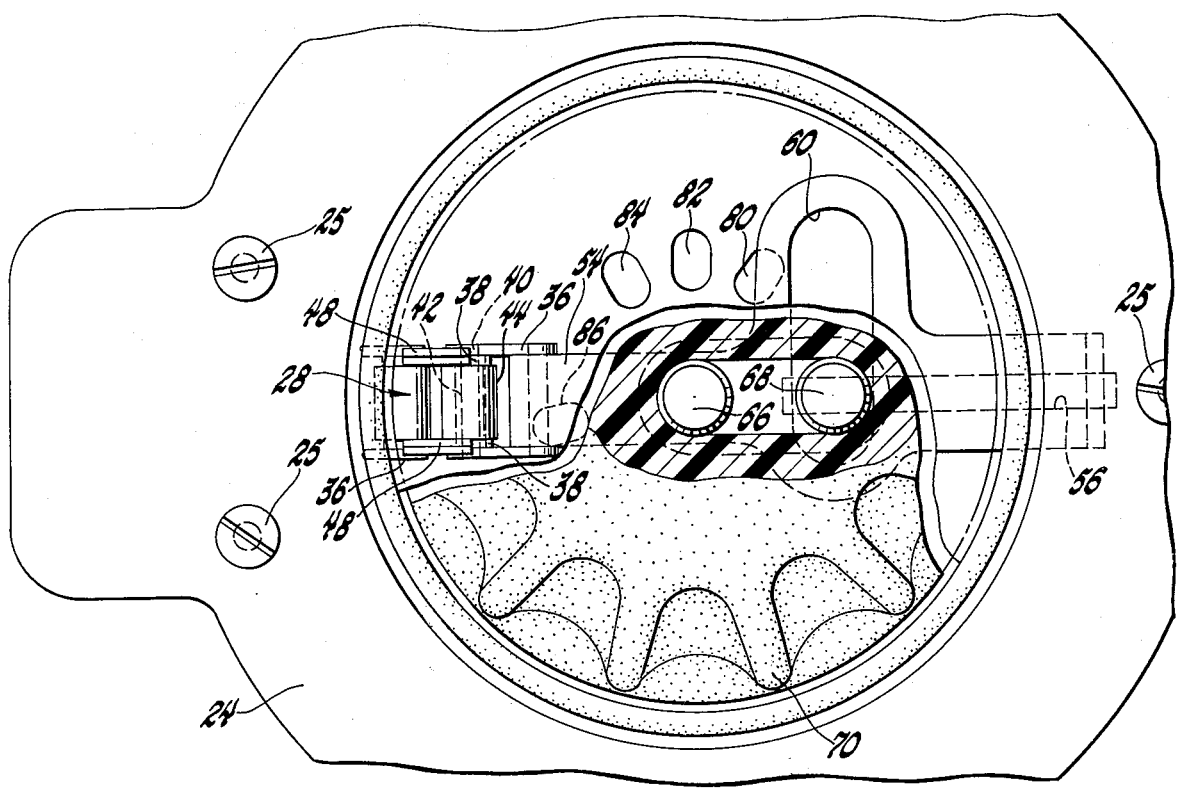
FIG. 4 is a partial sectional view taken along line 4—4 of FIG. 3.
Figure 5:
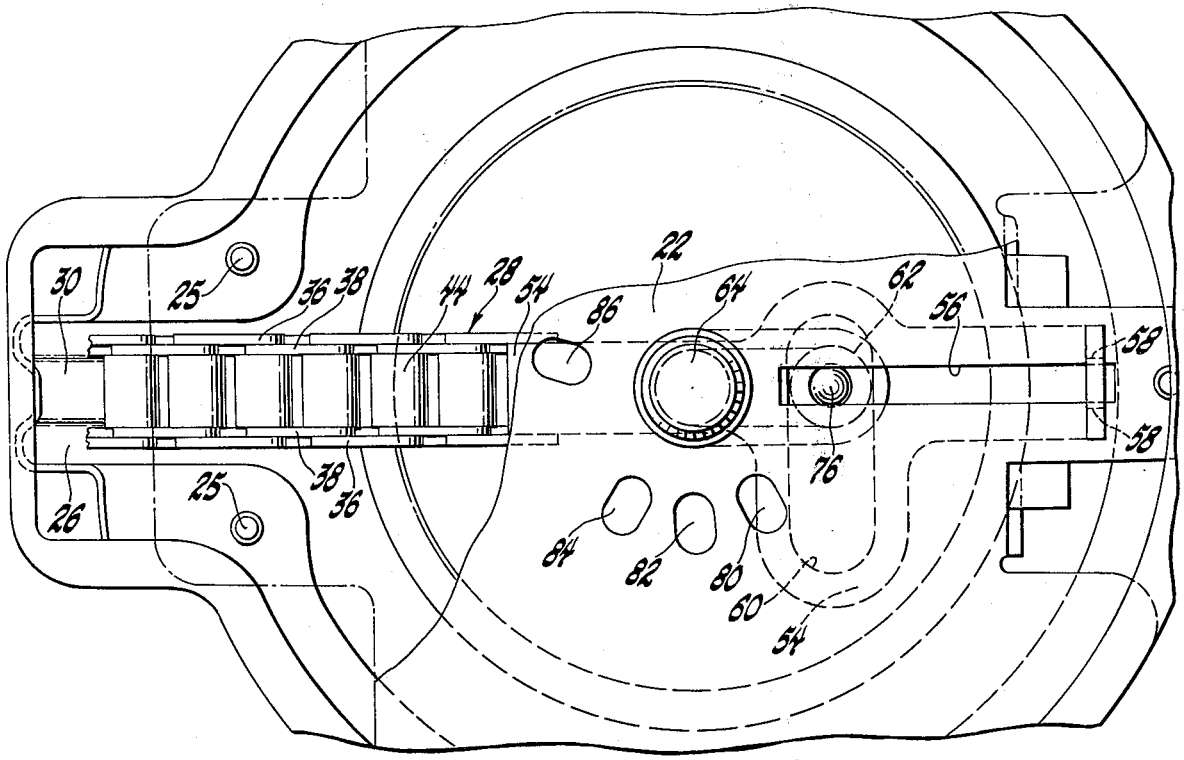
FIG. 5 is a view taken along line 5—5 of FIG. 3.
Figure 7:
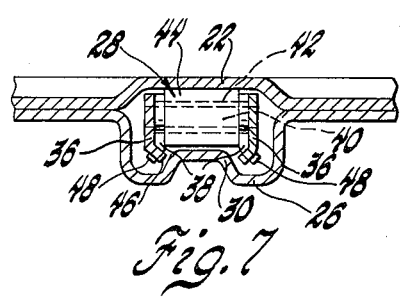
FIG. 7 is a sectional view taken along line 7—7 of FIG. 3.

The chain 28 has a plurality of outer links 36 and a plurality of inner links 38. As seen in FIGS. 4, 5, and 7 links 36 and 38 are joined in pairs and form the chain 28. The links 36 are secured together by pins 40 on which pins 40 is disposed a bushing 42 so that relative rotation can occur between the links 36 and 38. The bushing 42 is surrounded by the roller 44 which roller 44 can rotate relative to bushing 42 and is guided between the bracket 22 and the guide 26. As seen in FIGS. 3 and 7, the outer links 36 have a skirt portion 46 which angles inwardly while the inner links 38 have a skirt portion 48 which is angled outwardly.

The closure 16 has a bracket 50 secured thereto which is pivotally secured to a pair of the links 36 and has a shoulder portion 52 which is adapted to abut the skirts 46 of links 36 when the panel 16 is opened. Also, when the panel 16 is opened the skirts 46 and 48 are compressively loaded in abutting relation such that the chain 28 is moved in a straight line when moving substantially vertically to open the panel 16. However, the skirts 46 and 48 permit relative movement when the chain links are traversing the curved portion 34 of the guide 26. The end of the chain 28 opposite the panel 16 is pivotally secured to a pawl or yoke 54 which is slidably supported in a slot 56 formed in the bracket 22. The pawl 54 has formed thereon slots 58 which assist in guiding the pawl 54 on the bracket 22.

A slot 60 is formed in the pawl 54 which slot 60 has disposed therein a crank 62 framed on a driver to 63. The driver 63 has disposed thereon a pair of pins 64 and 66, with pins 64 being rotatably disposed in the bracket 22. The pin 66 and an extension 68 of crank 62 cooperate to secure a knob 70 to the driver 62. The knob 70 is rotatably supported on a bearing 72 disposed on the cover 24. When the knob 70 is rotated about the axis of pin 64 the crank 62 moves in the slot 60 to produce linear movement of the pawl 54. Linear movement of the pawl 54 results in linear movement of the chain 28, to produce opening and closing of the panel 16.

A detent 74 comprised of a ball 76 and the spring 78 is disposed in the crank 62 and cooperates with the detent stops 80, 82, 84, and 86 to provide a plurality of preselected opening positions of the panel 16. The ball 76 engages the slot 56 to establish the closed position of the panel 16.

The closure actuator shown in FIGS. 2 through 5 is designed for manual manipulation by the operator of the vehicle. To operate the closure 16 the operator merely reaches overhead to rotate the knob 70 in the desired direction to open or close the panel 16.

Figure 6:
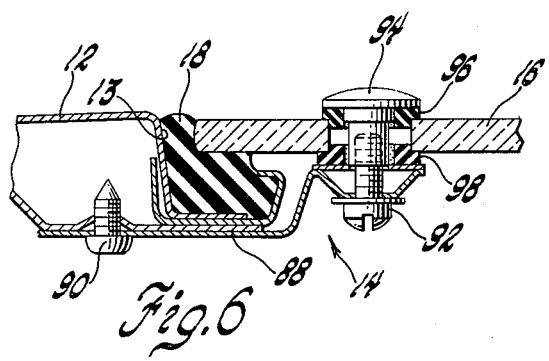
FIG. 6 is an enlarged sectional view taken along line 6—6 of FIG. 1.

As described above, the panel 16 is hinged to the roof member 12 by hinges 14. The hinge 14 maybe constructed in accordance with the hinge shown in FIG. 6. The hinge 14 is comprised of a flexible member 88 which is secured to the roof panel 12 by fasteners 90 through the panel 16 by a threaded fastener 92 secured in a threaded fastener 94. The threaded fastener 94 and flexible member 88 are separated from the panel 16 by annular seals 96 and 98 respectively which prevents leakage to the passenger compartment.

Figure 8:
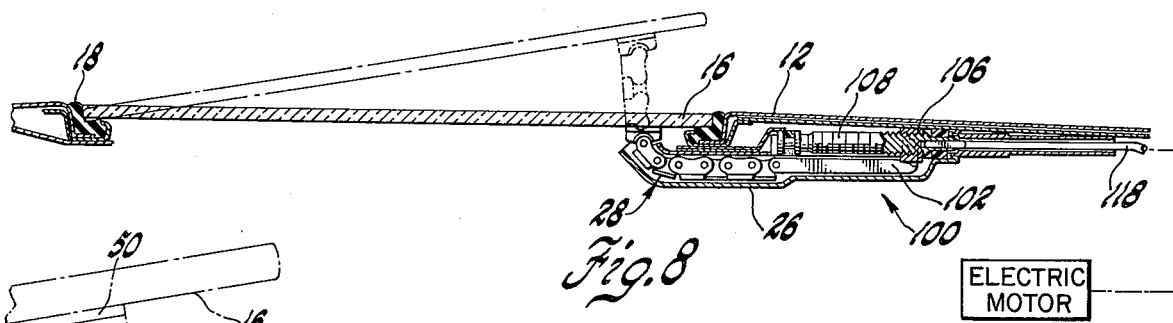
FIG. 8 is a cross-sectional view of another embodiment.
Figure 9:
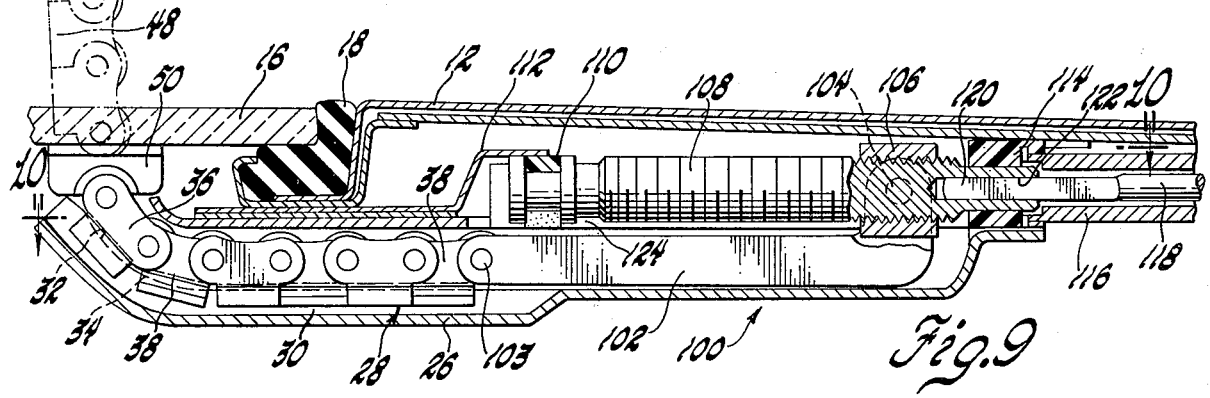
FIG. 9 is an enlarged view of a portion of FIG. 8.
Figure 10:
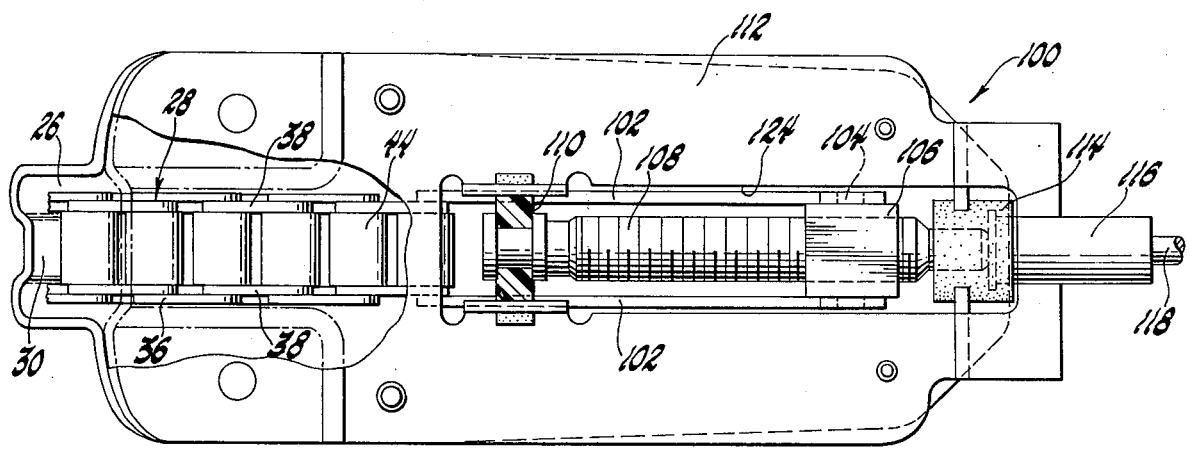
FIG. 10 is a view taken along line 10—10 of FIG. 9.

The actuator mechanism 100 shown in FIGS. 8, 9 and 10 is designed to provide a power operated closure. The actuator 100 has the same chain mechanism 28 as described above and substantially the same guide member 26 as described above except that it is not necessary to have an opening through the guide mechanism 26 to accommodate the inner knob 70. This also permits the elimination of a cover for the assembly. In the mechanism 100, a pair of inner links 38, at the end of chain 28 opposite the panel 16, are pivotally secured to a drive member or yoke 102 by a pin 103. The drive member 102 is pivotally connected by pins 104 to a drive nut 106 which is threadably disposed on a drive screw 108. The drive screw 108 is rotatably supported in a bushing 110 which is secured to a bracket 112. The bracket 112 in turn is secured to the roof panel 12. The drive screw 108 is also rotatably supported in a bushing 114 mounted on an extension 116 which is secured to the roof panel 12 and the guide 26. A drive cable 118 passes through the member 116 and has a square drive end 120 which drivingly engages a square opening 122 formed in the drive screw 108. The drive cable 118 may be rotated by any conventional electric drive motor such as those used to operate side window regulator mechanisms, commonly available in many automotive vehicles. When the drive cable 118 is rotated, the drive screw also rotates. The nut 106 and yoke 102 are prevented from rotation from a slot 124 formed in the bracket 112. Since the nut 106 can not rotate it traverses the drive screw 108 linearly to cause linear motion of the yoke 102 and drive chain 28. Thus the opening and closing of panel 16 is accommodated by the rotary motion of screw 108. As mentioned above, the screw 108 is driven by a cable 118 which can be drivingly connected to an electric motor. The electric motor in turn can be controlled by any conventional switching mechanism.

Obivously, many modifications and variations of the present invention are possible in light of the above teachings. It is, therefore, to be understood that within the scope of the appended claims the invention may be practiced otherwise than as specifically described.

What is claimed is:

1. In combination with a panel member having an aperture therein and a closure disposed thereon for pivoted movement in a predetermined path of motion with respect to said panel member between an open position and a closed position closing said aperture, a closure actuator assembly comprising, in combination, a housing rigidly supported on said panel member generally adjacent a marginal edge of said aperture, a moveable member, means supporting said movable member on said housing for linear bodily slidable movement along a predetermined linear path of motion in a plane parallel to a plane of said aperture, rotary input drive means disposed in said housing in a plane parallel to the plane of said aperture and being connected to said moveable member for effecting bodily shiftable movement of the latter in response to a rotary input thereto, a drive element flexible in only one direction and operative for force transmission in compression, means attaching one end of said drive element to said closure so that said one end is constrained for movement in the path of motion of said closure and substantially perpendicular to the plane of said aperture, means attaching the other end of said drive element to said moveable member so that said other end is constrained for movement in the path of motion of said moveable member, and guide means disposed on said housing between said moveable member and said aperture defining a guide portion extending across said marginal edge and including a first section aligned along the path of motion of said one end of said drive element and a second section aligned along the path of motion of said other end and a curved transition section therebetween, said drive element being slidably disposed in said guide portion so that bodily movement of said moveable member places said drive element in compression for moving said closure from the closed to the open position.

2. In combination with a panel member having an aperture therein and a closure disposed thereon for pivoted movement in a predetermined path of motion with respect to said panel member between an open position and a closed position closing said aperture, a closure actuator assembly comprising, in combination, a housing rigidly supported on said panel member generally adjacent a marginal edge of said aperture, a moveable member, means supporting said moveable member on said housing for substantially linear slidable movement along a predetermined path of motion in a plane parallel to the plane of said aperture, a screw member supported on said housing for rotation about an axis defined by the latter and oriented generally parallel to the plane of said aperture, a rotary output power source disposed remote from said housing, a flexible rotary cable disposed between said screw member and said power source for transferring torque between said power source for transferring torque between said power source and said screw member to effect rotation of the latter, a nut member threadably disposed on said screw member for linear bodily shiftable movement along said axis in response to rotation of said screw member, means securely connecting said moveable member to said nut member for bodily shiftable movement as a unit therewith, a drive element flexible in only one direction and operative for force transmission in compression, means attaching one end of said drive element to said closure so that said one end is constrained for movement in the path of motion of said closure and substantially perpendicular to the plane of said aperture, means attaching the other end of said drive element to said moveable member so that said other end is constrained for movement in the path of motion of said moveable member, and guide means disposed on said housing between said moveable member and said aperture defining a guide portion extending across said marginal edge and including a first section aligned along the path of motion of said one end of said drive element and a second section aligned along the path of motion of said other end and a curved transition section therebetween, said drive element being slidably disposed in said guide portion so that linear bodily movement of said moveable member places said drive element in compression for moving said closure from the closed to the open position.

3. In combination with a panel member having an aperture therein and a closure disposed thereon for pivotal movement in a predetermined path of motion with respect to said panel member between an open position and a closed position closing said aperture, a closure actuator assembly comprising, in combination, a housing rigidly supported in said panel member generally adjacent a marginal edge of said aperture, a moveable member, means supporting said moveable member in said housing in a plane parallel to the plane of said aperture for bodily shiftable movement along a predetermined path of motion, in a plane parallel to the plane of said aperture, a crank member supported on said housing for rotation about an axis defined by said housing and oriented generally perpendicular to the plane of said aperture, handle means disposed on said crank member and being manually operable to effect rotation of said crank member, means on said crank member defining a crank pin offset from said axis and rotatably thereabout in response to rotation of said crank member, means on said moveable member defining a slot adapted for sliding reception of said crank pin so that rotation of said crank member effects bodily shiftable movement of said moveable member, a drive element flexible in only one direction and operative for force transmission in compression, means attaching one end of said drive element to said closure so that said one end is constrained for movement in the path of motion of said closure and substantially perpendicular to the plane of said aperture, means attaching the other end of said drive element to said moveable member so that said other end is constrained for movement in the path of motion of said moveable member, and guide means disposed on said housing between said moveable member and said aperture defining a guide portion extending across said marginal edge and including a first section aligned along the path of motion of said other end and a curved transition section therebetween, said drive element being slidably disposed in said guide portion so that bodily movement of said moveable member places said drive element in compression for moving said closure from the closed to the open position.

* * * * *

UNITED STATES PATENT AND TRADEMARK OFFICE
CERTIFICATE OF CORRECTION

PATENT NO. : 3,911,802
DATED : October 14, 1975
INVENTOR(S) : Russell L. Morden

It is certified that error appears in the above-identified patent and that said Letters Patent are hereby corrected as shown below:

Column 4, line 58, delete "for transferring torque between said".

Column 4, line 59, delete "power source".

Signed and Sealed this third Day of February 1976

[SEAL]

Attest:

RUTH C. MASON
Attesting Officer

C. MARSHALL DANN
Commissioner of Patents and Trademarks